(12) United States Patent
Buhl

(10) Patent No.: US 11,236,872 B2
(45) Date of Patent: Feb. 1, 2022

(54) CHARGING STATION FOR FLASHLIGHTS

(71) Applicant: Ledlenser GmbH & Co. KG, Solingen (DE)

(72) Inventor: Erich Buhl, Solingen (DE)

(73) Assignee: LEDLENSER GMBH & CO. KG, Solingen (DE)

(*) Notice: Subject to any disclaimer, the term of this patent is extended or adjusted under 35 U.S.C. 154(b) by 82 days.

(21) Appl. No.: 16/771,019

(22) PCT Filed: Nov. 14, 2018

(86) PCT No.: PCT/DE2018/100929
§ 371 (c)(1),
(2) Date: Jun. 9, 2020

(87) PCT Pub. No.: WO2019/114858
PCT Pub. Date: Jun. 20, 2019

(65) Prior Publication Data
US 2021/0164625 A1    Jun. 3, 2021

(30) Foreign Application Priority Data

Dec. 13, 2017 (DE) .......................... 102017129815.0

(51) Int. Cl.
*F21L 4/08* (2006.01)
*F21V 21/096* (2006.01)
(Continued)

(52) U.S. Cl.
CPC .......... *F21L 4/085* (2013.01); *F21V 21/0965* (2013.01); *F21V 23/06* (2013.01);
(Continued)

(58) Field of Classification Search
CPC ................................ H02J 7/0044; F21L 4/085
See application file for complete search history.

(56) References Cited

U.S. PATENT DOCUMENTS

| 4,092,580 A | 5/1978 | Prinsze |
| 4,388,673 A | 6/1983 | Maglica |
(Continued)

FOREIGN PATENT DOCUMENTS

| DE | 10 2014 113 932 A1 | 3/2016 |
| DE | 20 2016 103 327 U1 | 8/2016 |
(Continued)

OTHER PUBLICATIONS

International Search Report and Written Opinion for Application No. PCT/DE2018/100929 dated Jan. 31, 2019.

*Primary Examiner* — Alexander K Garlen
(74) *Attorney, Agent, or Firm* — Alston & Bird LLP

(57) ABSTRACT

The invention relates to a charging station with a charging contact device (20) and an accumulator-operated flashlight (10) with charging contacts (14, 15), arranged transverse to the flashlight longitudinal axis and insulated with respect to one another, on the flashlight housing casing, which, when the accumulators are being recharged, bear electrically conductively against charging contact points (28, 29) of the charging contact device (20). According to the invention the charging station is characterised in that each of the two charging contacts (14, 15) extends on the flashlight housing over a circular arc of <180°, in that the charging contact device (20) has a base body (21) with a contact face (25) and two side bodies (23, 24) with faces on which charging contact points (28, 29) are arranged, and in that the side bodies (23, 24) each contain a magnet (27), the magnetic force field of which is able to fix the positioning of the flashlight (10) in a stable and functionally reliable manner when the accumulators are being recharged.

11 Claims, 4 Drawing Sheets

(51) Int. Cl.
*F21V 23/06* (2006.01)
*H02J 7/00* (2006.01)
*F21Y 115/10* (2016.01)

(52) U.S. Cl.
CPC ............... *H02J 7/0044* (2013.01); *F21L 4/08* (2013.01); *F21Y 2115/10* (2016.08); *H02J 2310/22* (2020.01)

(56) References Cited

U.S. PATENT DOCUMENTS

| | | | | |
|---|---|---|---|---|
| 5,432,689 | A * | 7/1995 | Sharrah | F21V 23/0414 |
| | | | | 362/183 |
| 2005/0135091 | A1* | 6/2005 | Sharrah | F21L 4/085 |
| | | | | 362/205 |
| 2006/0232239 | A1* | 10/2006 | Maglica | H02J 7/0044 |
| | | | | 320/107 |
| 2007/0171082 | A1* | 7/2007 | Melnik | F21L 4/005 |
| | | | | 340/574 |
| 2007/0253194 | A1* | 11/2007 | Sharrah | H02J 7/0044 |
| | | | | 362/183 |
| 2008/0284374 | A1* | 11/2008 | Gardner | H02J 7/0044 |
| | | | | 320/115 |
| 2011/0149560 | A1 | 6/2011 | Jessup et al. | |
| 2011/0228521 | A1* | 9/2011 | Sharrah | H01M 50/116 |
| | | | | 362/183 |
| 2014/0197781 | A1* | 7/2014 | Maglica | H02J 7/0042 |
| | | | | 320/107 |
| 2016/0268827 | A1* | 9/2016 | Ziegenfuss | H02J 7/007184 |

FOREIGN PATENT DOCUMENTS

| | | | |
|---|---|---|---|
| EP | 2216871 | | 8/2010 |
| ES | 2206033 | A1 | 5/2004 |
| WO | WO 9929009 | A1 | 6/1999 |
| WO | WO-2006012701 | A1 * | 2/2006 ............. H02J 50/10 |

* cited by examiner

CHARGING STATION FOR FLASHLIGHTS

CROSS-REFERENCE TO RELATED APPLICATIONS

This Application is National Phase Entry of PCT Application Serial No. PCT/DE2018/100929 filed on Nov. 14, 2018, published as PCT Publication No. WO2019/114858, which claims priority to German Patent Application Serial No. 10 2017 129 815.0 filed on Dec. 13, 2017, the contents of each of which are hereby incorporated by reference in their entirety.

FIELD OF THE INVENTION

The invention relates to a charging station with a charging contact device and a battery-operated flashlight with charging contacts arranged on the flashlight housing casing transverse to the flashlight longitudinal axis and insulated with respect to one another, which abut in an electrically conductive manner on charging contact points of the charging contact device during recharging of the batteries.

BACKGROUND

Battery-operated flashlights are indispensable in the event of a power failure or in the absence of a fixed network connection. The active operating life of a flashlight is limited by the battery capacity. A substantial improvement in the operating life was achieved by the use of light-emitting diodes instead of the incandescent lamp, because the LED power consumption is much lower.

In the case of frequent usage it makes sense to use rechargeable batteries (accumulators). One possibility known according to the prior art consists in removing the batteries whose capacity has been exhausted from the flashlight and inserting these rechargeable batteries into a separate battery-charging device and leaving them there until the maximum charging capacity is attained. During this time, the flashlight cannot be used or must be operated by means of another battery set or another battery. In many devices operated by rechargeable batteries, in particular mobile telephones, the battery can remain in the device during recharging if this device has a plug contact, via which the device is connectable to a charging device connected to a stationary power source.

Furthermore, charging stations are known. In DE 297 21 015 U1 the charging station has a mounting for a battery-operated manual device into or onto which the manual device can be placed, as well as a power unit plug, which can be connected electrically conductively to the manual device arranged in the mounting by means of electrical contacts. The manual device is to be fixable in different angular positions to the insertion or positioning direction on the mounting, wherein electrical contacts are associated with these positions.

In U.S. Pat. No. 4,092,580 B1 a charging station for a flashlight is described in which the flashlight can be plugged detachably into a holding device via a clamping mechanism. This charging station has the disadvantage, however, that manual devices that have to be removed from the charging station quickly first have to be disconnected from it. If this has to happen quickly in a professional sphere of use, e.g. in the case of the police or fire brigade, there is a risk that existing plug connections may be slightly damaged.

EP 2 216 871 therefore proposes a charging station with a charging contact device and with a battery-operated flashlight in which the flashlight has a contact device and at least partly a ferromagnetic material. The charging contact device has a magnet, which can be brought into operative connection with the ferromagnetic material such that the charging contact device of the charging station and the contact device of the flashlight can be brought correspondingly into contact. The charging station is arranged on a mounting such that the flashlight is held in a perpendicularly arranged mounting by the magnet in the charging state. Such a charging station presupposes an attachment of the mounting to the wall in a vertical position, however, which is not always the case. Locally flexible use of such a charging station is not possible. Another disadvantage of the charging station consists in the fact that the holding force must be applied solely by a magnet, and must be great enough to bear the weight of the flashlight. Knocking the flashlight accidentally can therefore lead to the light becoming detached from the mounting and falling to the floor.

In DE 10 2014 113 932 A1 a charging station with a battery-operated electric flashlight is described, wherein the charging station comprises a charging cradle and a charging contact device and at least two charging contacts, which are connected electrically conductively to other electronics. The charging contacts project like a pin over the surface of the charging cradle. The flashlight describes an end face, arranged in which are an electrical actuating element, which projects above the end face, and a contact device, which have at least two electrical contact faces, wherein the contact faces are arranged around the electrical actuating element in an annular and axially symmetrical orientation and insulated by an insulating element. The flashlight can be placed by its end face detachably into the charging station, wherein the charging contact device of the charging station and the contact device of the flashlight can be brought into corresponding contact by this, but a distance is maintained between the end face of the flashlight and the surface of the charging radiator that is greater than the projection of the actuating element above the end face. With this device also the flashlight must be inserted vertically. In addition, the charging contacts must be spring-loaded to guarantee sufficient contact closure, which is indispensable for recharging.

In DE 20 2016 103 327 U1 a flashlight with charging station is proposed in which a number of charging contacts are to be arranged spaced at a distance from one another on the housing outer casing, so that the contacting of the charging contacts takes place transversely to the housing longitudinal direction. For mechanical holding a clamp mounting based on spring force is used in which the flashlight is held at two points, namely close to the head and close to the foot in the charging station.

BRIEF SUMMARY

The object of the present invention is to create a charging station with a charging contact device and a battery-operated flashlight, which are constructed in an easily manageable and structurally simple manner.

This object is achieved by the charging station according to claim 1, which is characterized according to the invention in that each of the two charging contacts on the flashlight housing extends over a circular arc of <180°, in that the charging contact device has a base body with a support surface and two lateral bodies with faces on which charging contact points are respectively arranged and in that the lateral bodies each contain a magnet, by the magnetic force field of which the flashlight can be fixed positionally and functionally securely in position during recharging of the batteries.

The particular advantage of this charging station consists in the fact that the flashlight can be inserted at least substantially in a horizontal position into the charging station, wherein the spatial position of the flashlight is clearly fixed on the one hand by the lateral bodies (in a transverse direction) and by the magnets present in each lateral body (in a longitudinal direction). No springs, clamping bodies or other parts sensitive to wear are required for this fixing. The charging station is not limited to local installation, but can also be carried in motor vehicles and used if the charging station transformer that is necessary anyway can be coordinated to the onboard supply voltage. The magnet present delivers sufficient force to ensure the contact closure during the charging process. The light can nevertheless be removed easily from the charging device without adhering to a preferred removal direction or without other clamping bodies having to be released.

Further developments of the invention are described in the subordinate claims.

Thus the lateral bodies are preferably arranged vertically to the support surface and have a height that is greater than the flashlight radius in the region in which the charging contacts of the flashlight are arranged. This measure permits lateral stabilization of the flashlight during the charging process without unnecessarily restricting the possible removal directions for the flashlight from the charging mounting.

According to another advantageous configuration, the flashlight has a lamp head with a greater diameter than the diameter of the remaining lamp housing, wherein the diameter varies abruptly. The charging contacts of the flashlight are arranged on the annular diameter expansion and rest— due to the magnetic force—on an end face of the lateral bodies during the recharging process. In other words, the flashlight has a "stepped" expansion of the lamp body, creating an annular face which rests during the recharging process on the end face of each lateral body. These end sides thus offer the "stop faces" for the lamp head end facing the remaining lamp housing. The longitudinally axial position of the flashlight is clearly defined during the recharging process by this. In addition, the base surface can have a trough-shaped depression in a front region, the radius of which depression is at least as large as the radius of the flashlight head. This depression is used for further clear positional definition of the flashlight in the charging station during recharging.

The partly circular contact points on the lamp housing are preferably arranged in mirror symmetry to a cross-sectional plane in which a switch is arranged on the lamp housing casing for switching the lamp on and off.

In the selected charging contact device, two charging contacts on the lamp housing casing are used which extend over a circular arc of <180°. The angular dimension below 180° comes about due to the fact that the charging contacts must be insulated with respect to one another, whereby the angular dimension of less than 180° can be explained. The first insulator is preferably chosen roughly at the level of the casing area in which the switch of the flashlight is also located, whereas the other insulator is arranged diametrically opposite. Due to this selection, the angle of rotation at which the lamp must be inserted for recharging is also immediately recognizable for the user; in the simplest case he must only take care to ensure that the on/off switch is brought into an upper placement position.

According to another configuration, the partially circular contact points on the lamp housing consist of ferromagnetic material, which can enter into interaction with the permanent magnets arranged in the lateral bodies.

BRIEF DESCRIPTION OF THE FIGURES

Further details of the invention are depicted in the drawings. These show.

DETAILED DESCRIPTION

Figure 1:
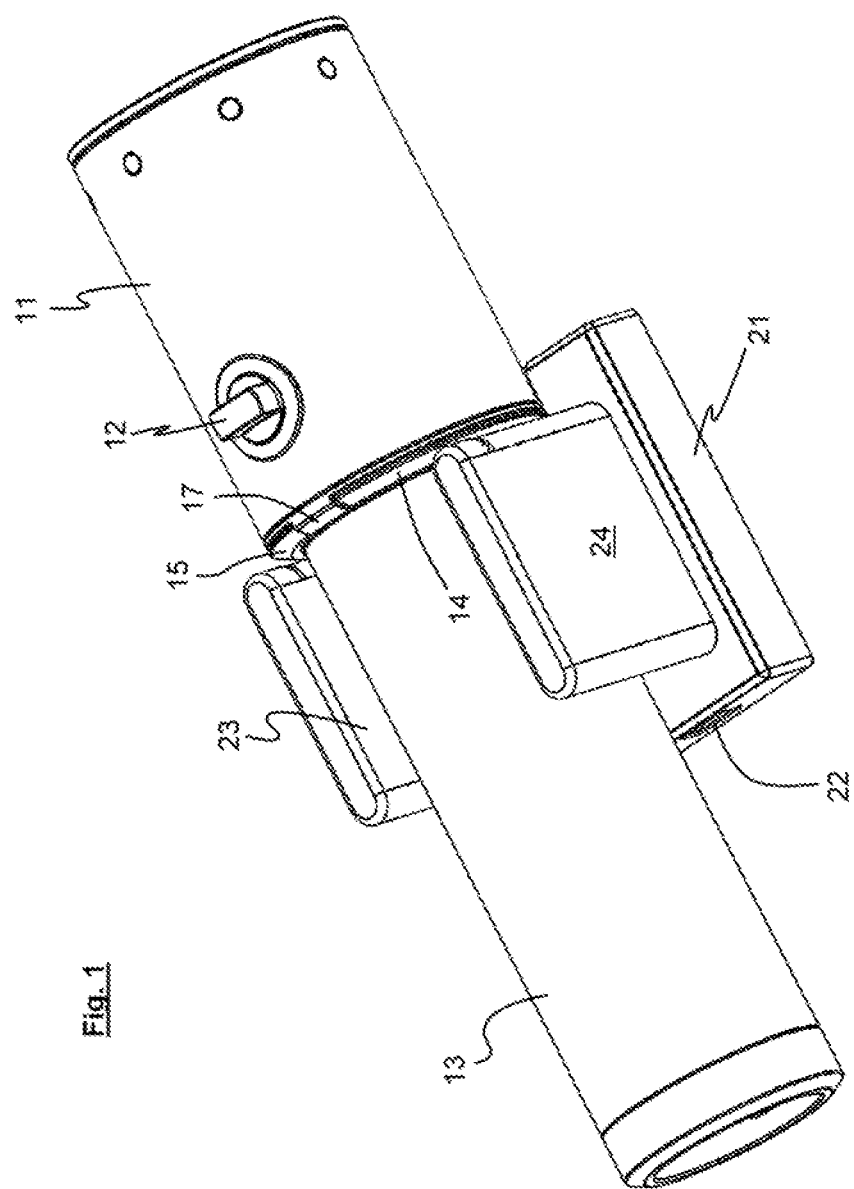
FIG. 1 a view in perspective of a charging station with a charging contact device and a flashlight, FIG. 2 a view in perspective of the charging station with a partial sectional view of a lateral body, FIG. 3 the charging station with flashlight removed and FIG. 4 the charging contact device in a partial sectional view in perspective.

The charging station depicted in FIGS. 1 to 4 is composed of a flashlight 10 and a charging contact device 20. The flashlight has a lamp head 11, which is formed cylindrically and has a switch 12 for switching the flashlight on and off on its casing side. In the lamp head are the light source, namely an LED arranged on a circuit board inclusive of power supply and at least one lens, which is arranged movably in a longitudinally axial manner relative to the LED to change the light beam and which has an adjustment mechanism operable via the switch 12. The lamp head 11 is widened in diameter in a stepped manner relative to the flashlight housing 13. The batteries are held in the housing 13. At the transition of the lamp head 11 to the lamp housing 13, two charging contacts 14, 15 are arranged, which extend virtually in a semicircle over a circular arc of almost 180°. Insulators 16 and 17 are provided respectively between the partial ring ends of the charging contacts 14, 15. The charging contact device 20 has a base body 21 with a connection socket 22 for plugging in a charging cable connected to a suitable transformer. The charging station also has two lateral bodies 23, 24 arranged vertically to this.

Figure 4:
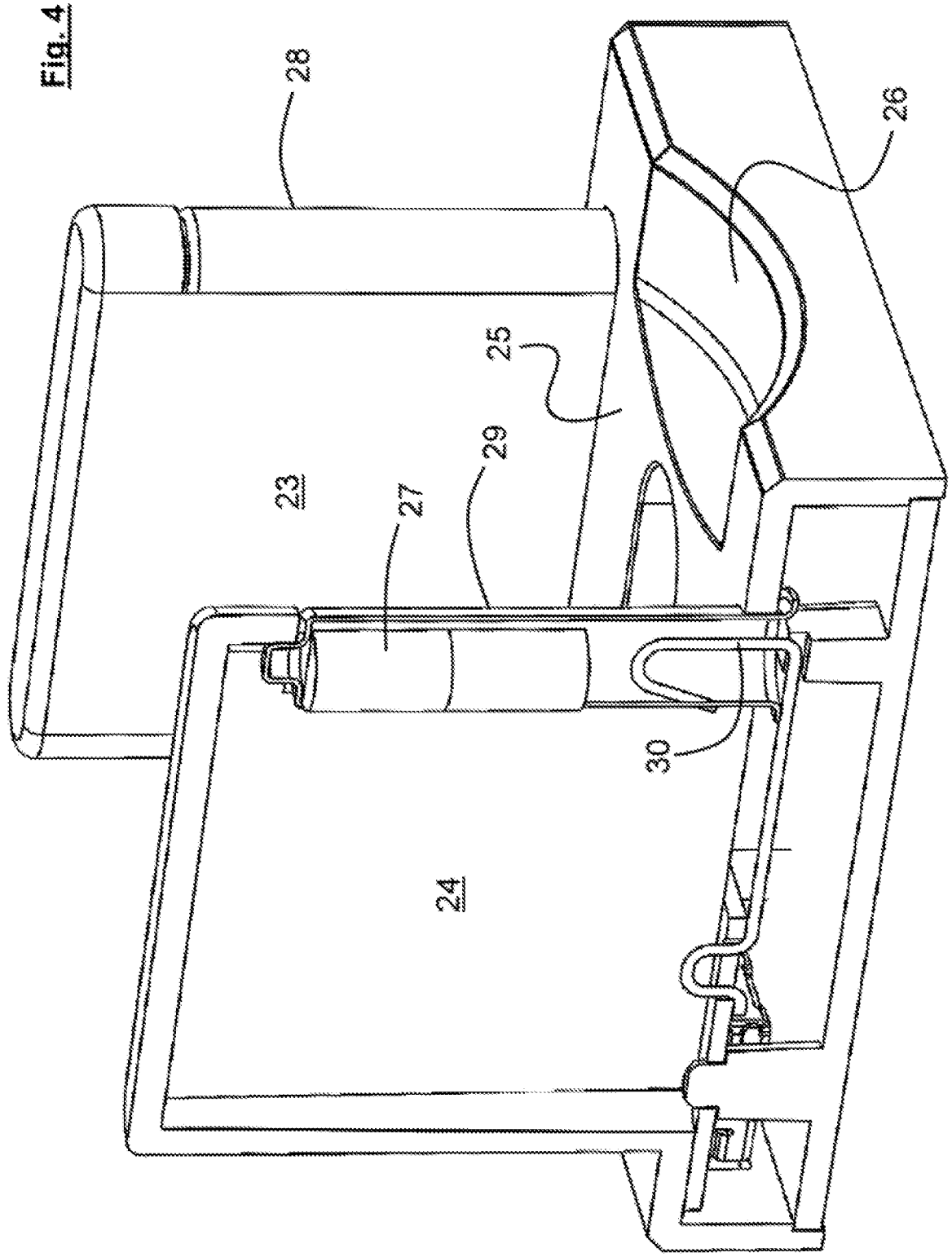

As is clear from FIG. 4, the base body has a support surface 25 as well as a trough-shaped recess 26 with a radius at least as great as the radius of the flashlight head 11; ideally the radii are approximately of equal size. Contained in each of the lateral bodies 23 and 24 towards a front end is a permanent magnet 27. The lateral bodies 23 and 24 have a height that is smaller than the diameter of the lamp housing part 13, at least the height is greater than its radius. The lateral bodies 23 and 24 are each rounded at the front and rear side. The rounded edges 28 and 29 are used as charging contact points on which the charging contacts 14, 15 abut with contact and electrically conductively for recharging of the batteries. A spring clip 30, which is arranged in each lateral body 23 and 24 and is connected to the connection socket 22, is used to supply power.

Figure 2:
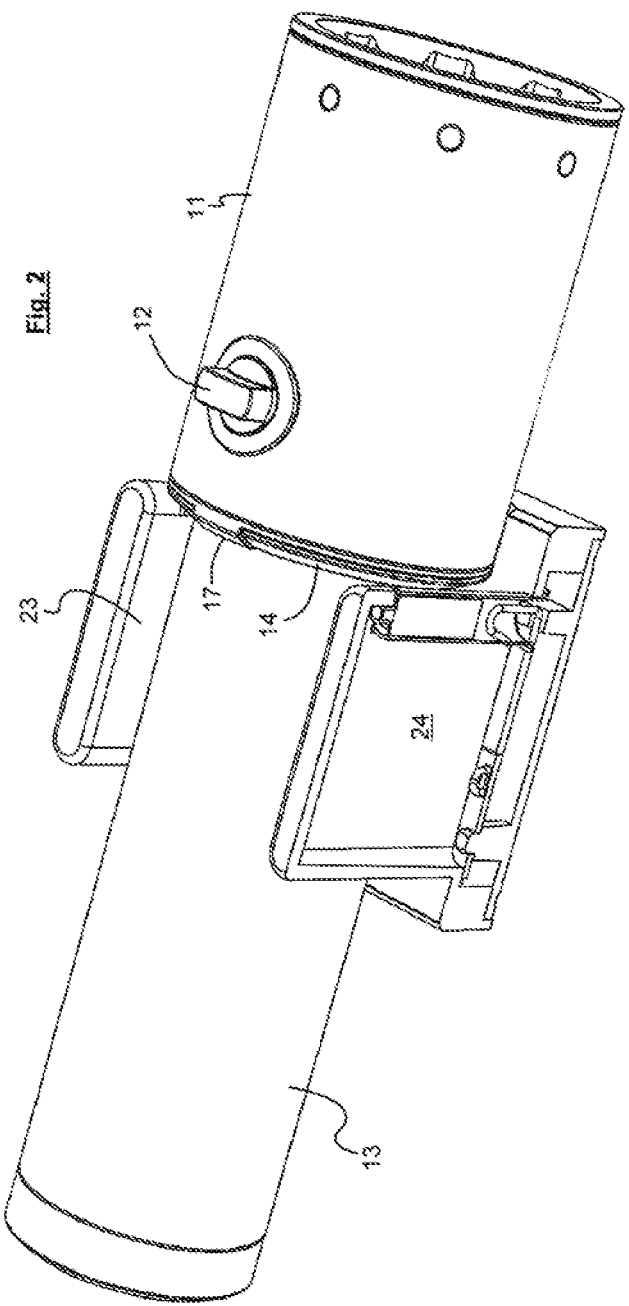
Figure 3:
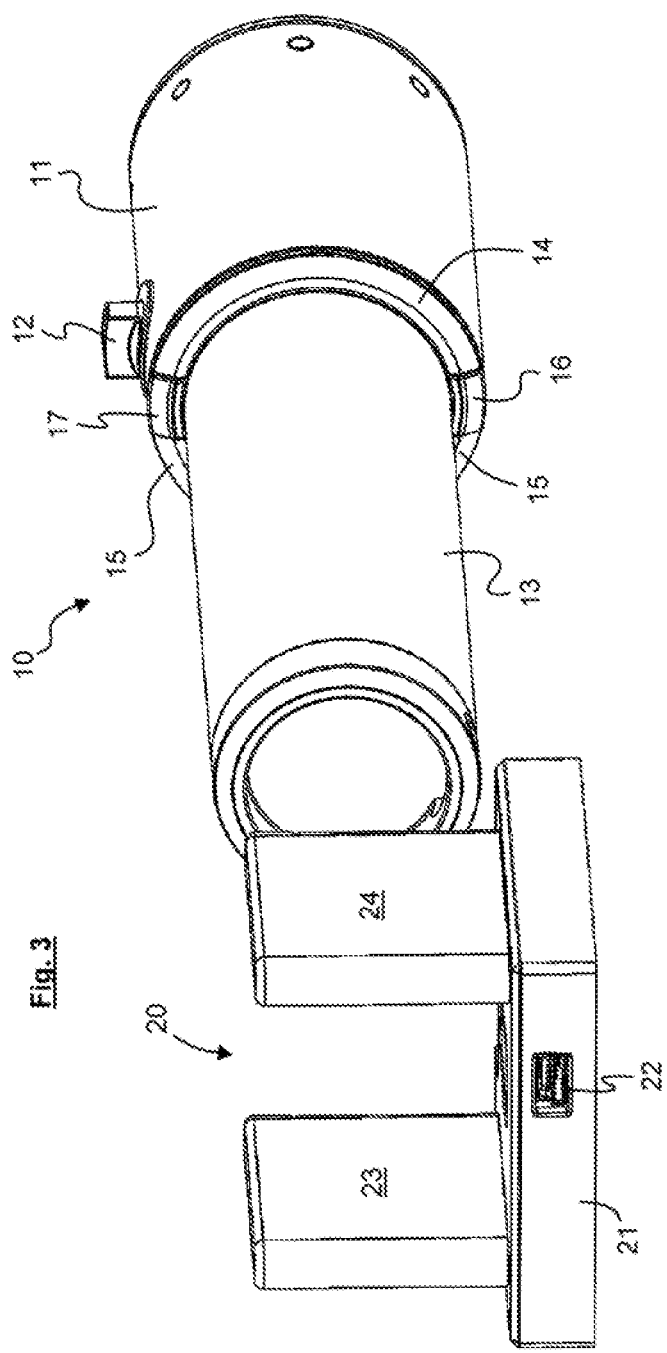

If the batteries of the flashlight 10 are to be charged, the lamp housing 13 is introduced between the lateral bodies 23 and 24, wherein the operator only has to take care to ensure that the switch 12 lies on top, meaning the position depicted in FIGS. 1 and 2, for example. Slight shifts in the rotary angle are insignificant because it only matters that the charging contact 15 comes into contact with the contact face 28 and charging contact 14 with the contact face 29. Serving as a centering aid is the trough-shaped depression 26, the curvature of which roughly corresponds to the curvature of the lamp head 11. The charging position is always reproducible when the contact faces 14 and 15 are brought to rest on the contact faces 28 and 29 as a stop. The stability of this charging position is guaranteed by the permanent magnet 27 contained in each lateral body, because the charging contacts 14 and 15 consist of ferromagnetic material, which is attracted by the magnet 27.

The charging device can be placed in any location, wherein the standing surface does not even have to be horizontal, because the two permanent magnets 27 in the lateral bodies 23 and 24 apply the required holding force. On completion of the charging process or, if the battery has attained a minimal charging state, during the charging process, the flashlight can be grasped on the flashlight housing 13 or at the lamp head 11 and removed anyway. Clamps do not have to be released here, nor is particular caution required when removing the lamp from the charging station. The charging station is thus very largely unsusceptible to mechanical damage and is easy to handle. Short circuit contacts are effectively prevented by the choice of the partially circular charging contacts 14 and 15 and the insulators 16, 17.

REFERENCE CHARACTER LIST

10 Flashlight
11 Lamp head
12 Switch
13 Flashlight housing
14, 15 Charging contacts
16, 17 Insulators
20 Charging contact device
21 Base body
22 Connection socket
23, 24 Lateral bodies
25 Support surface
26 Trough-shaped depression
27 Permanent magnet
28, 29 Charging contact points
30 Spring dip

The invention claimed is:

1. A charging station with a charging contact device and a battery-operated flashlight, the battery-operated flashlight extending along a longitudinal axis and comprising a flashlight housing and two charging contacts arranged on the flashlight housing transverse to the longitudinal axis and insulated with respect to one another, wherein the two charging contacts engage, in an electrically conductive manner, the charging contact points of the charging contact device during recharging of the battery-operated flashlight,
   wherein each of the two charging contacts on the flashlight housing extend over a circular arc of less than 180°,
   wherein the charging contact device comprises a base body with a support surface and two lateral bodies with faces on each of which respective charging contact points are arranged, and the two lateral bodies each contain a magnet,
   wherein the flashlight is fixed positionally and functionally securely in position during recharging by a magnetic force field of each of the magnets,
   wherein the battery-operated flashlight comprises a lamp head with a relatively larger diameter than a diameter of a remainder of the flashlight housing,
   wherein the two charging contacts of the flashlight are arranged on an annular diameter expansion between the relatively larger diameter of the lamp head and the diameter of the remainder of the flashlight housing, and
   wherein the two charging contacts engage end faces of the lateral bodies during recharging.

2. The charging station according to claim 1, characterized in that the two lateral bodies are arranged vertically to the support surface and have a height that is greater than half of the annular diameter expansion on which the two charging contacts of the flashlight are arranged.

3. The charging station according to claim 1, wherein the support surface has a trough-shaped depression in a front region, a radius of the trough-shaped depression is at least as big as half of the diameter of the lamp head.

4. The charging station according to claim 1, wherein the charging contact points on the flashlight housing are arranged in mirror symmetry to a cross-sectional plane in which a switch is arranged on the flashlight housing to switch the flashlight on and off.

5. The charging station according to claim 1, wherein the contact points on the flashlight housing consist of ferromagnetic material and the magnets arranged in the lateral bodies are permanent magnets.

6. The charging station according to claim 2, wherein the base support surface has a trough-shaped depression in a front region, a radius of the trough-shaped depression is at least as big as half of the diameter of the lamp head.

7. The charging station according to claim 2, wherein the charging contact points on the flashlight housing are arranged in mirror symmetry to a cross-sectional plane in which a switch is arranged on the flashlight housing to switch the flashlight on and off.

8. The charging station according to claim 3, wherein the charging contact points on the flashlight housing are arranged in mirror symmetry to a cross-sectional plane in which a switch is arranged on the flashlight housing to switch the flashlight on and off.

9. The charging station according to claim 2, wherein the contact points on the flashlight housing consist of ferromagnetic material and the magnets arranged in the lateral bodies are permanent magnets.

10. The charging station according to claim 3, wherein the contact points on the flashlight housing consist of ferromagnetic material and the magnets arranged in the lateral bodies are permanent magnets.

11. The charging station according to claim 4, wherein the contact points on the flashlight housing consist of ferromagnetic material and the magnets arranged in the lateral bodies are permanent magnets.

* * * * *